W. Massey.

Upsetting Tires.

No. 888. Reissued Jan. 24, 1860.

Witnesses:
Henry Baldwin
James James.

Inventor:
C. L. Crowell & Robt. Smith assignees
by their attorney
F. Southgate Leavitt

UNITED STATES PATENT OFFICE.

C. L. CROWELL AND ROBERT SMITH, OF PEORIA, ASSIGNEES OF WILLIAM MASSEY, OF GREENE COUNTY, ILLINOIS.

IMPROVED MACHINE FOR CONTRACTING METAL BANDS.

Specification forming part of Letters Patent No. 6,573, dated July 3, 1849; Reissue No. 888, dated January 24, 1860.

DIVISION B.

*To all whom it may concern:*

Be it known that WILLIAM MASSEY, of the county of Greene, State of Illinois, has invented a new and useful Machine for Contracting or Upsetting Metallic Bars or Bands, of which the following is a full, clear, and accurate description, reference being had to the accompanying drawings, forming a part of this specification, in which—

Figure 1:
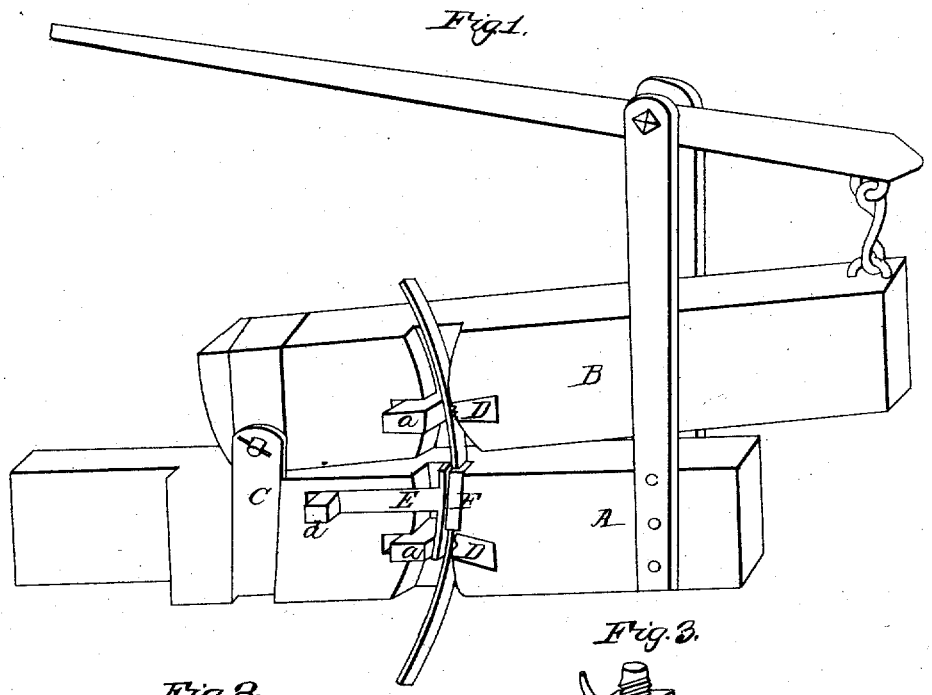
Figure 2:
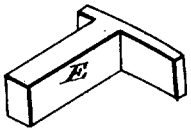
Figure 3:
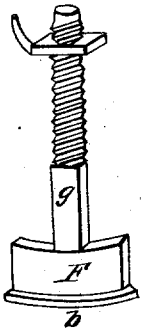

Figure 1 represents a perspective view of a machine for upsetting or contracting bars of metals. Fig. 2 represents a perspective view of the guide-plate. Fig. 3 represents a perspective view of the supporting rest for the metal.

The object of this invention is an improvement in the method of shortening by compression, or, as it is termed in the art, "upsetting" metallic bands or bars, causing them to assume new forms and dimensions between the points at which they are upset. The method by which I propose to effect this object consists in clamping the bar rigidly at two points and moving the points to which the bar is clamped toward each other, by which means the bar is upset or compressed and shortened between these two points. This method also consists in forcing that portion of the bar which is being upset into a mold or matrix, by which it is caused to assume the reverse of the shape of the matrix or die in which it is forced during the process of compression.

In the accompanying drawings, the machine by which we effect this object in the present instance is represented as adapted to the upsetting or contracting bars of metal or the tires or bands of vehicles.

This machine consists of two levers, A and B, connected at one end by a hinge-joint, C. Each lever is provided with a clamping-jaw consisting of metallic blocks D, with serrated faces and a holding or fastening wedge, *a*, by which the metal bar or band to be upset is clamped to each lever. The lever A is also provided with an adjustable mold of matrix, consisting of two parts, E and F. The part E is T-shaped, with a face slightly convex, to conform to the interior surface of a band or tire to which the present machine is adapted, and is made adjustable, to regulate the depth of the mold, by means of a wedge, *d*, which forces it in the direction of the serrated blocks. The other part, F, of the matrix is concave on its inner face, to conform to the exterior surface of a band or tire, and is provided with an outer lip or flange, *b*, which extends over the edge of the matrix when both parts are near each other, and regulates the width of the mold. To the matrix F is attached a shank, *g*, which passes through the lever A, and by means of a thumb-screw, *d*, on its outer end is made adjustable in a direction at right angles to the matrix E.

In upsetting or compressing metal bars or bands with this machine, the bar of iron or other metal is heated, if necessary, and the levers opened the distance it is desired to contract the band or bar or to give the amount of metal when the bar is compressed to fill the mold. The bar is then clamped rigidly to each lever by driving the wedges *a*, which forces the bar against the serrated jaws and prevents it from sliding or slipping in either jaw. The levers are then brought toward each other, by which the metal between the two jaws is compressed or upset from opposite directions, the band shortened, and the metal caused to fill the mold, which gives to this part of the bar the reverse of the form of the outline of that mold.

What we claim as the invention of WILLIAM MASSEY, and desire to secure by Letters Patent, is—

1. The method of upsetting or shortening by compression bands or bars of metal by clamping the bar or band rigidly on either side of the point at which it is to be upset, and then moving the clamps toward each other, substantially as described.

2. The method of giving the required form and size and shape to a metal band or bar while being upset by clamping it on either side of the point at which it is to be upset, and forcing it by moving the clamps toward each other in a mold or matrix, substantially as described.

In testimony whereof we have subscribed our names.

C. L. CROWELL,
ROBERT SMITH,
*Assignees.*

In presence of—
BERNARD BAILY,
DAVID A. WHEELER.